(12) United States Patent
Bach

(10) Patent No.: US 7,134,206 B2
(45) Date of Patent: *Nov. 14, 2006

(54) COMBINATION UTENSIL

(76) Inventor: Gregory P. Bach, 2415 N. Broad St., Colmar, PA (US) 18915

( * ) Notice: Subject to any disclaimer, the term of this patent is extended or adjusted under 35 U.S.C. 154(b) by 0 days.

This patent is subject to a terminal disclaimer.

(21) Appl. No.: 11/368,687

(22) Filed: Mar. 6, 2006

(65) Prior Publication Data

US 2006/0143927 A1   Jul. 6, 2006

Related U.S. Application Data

(63) Continuation of application No. 10/407,815, filed on Apr. 3, 2003, now Pat. No. 7,024,777.

(60) Provisional application No. 60/369,551, filed on Apr. 3, 2002.

(51) Int. Cl.
*A22C 29/02* (2006.01)

(52) U.S. Cl. ............................. 30/120.1; 30/147; 452/6

(58) Field of Classification Search ............... 30/120.1, 30/137, 147, 148; 452/6; D7/106
See application file for complete search history.

(56) References Cited

U.S. PATENT DOCUMENTS

| | | | |
|---|---|---|---|
| 849,098 A | 4/1907 | Aufrichtig | |
| 2,607,988 A * | 8/1952 | Williams | 30/322 |
| D183,525 S * | 9/1958 | Kaye | D7/656 |
| 4,172,306 A | 10/1979 | Hopkins | |
| 4,200,961 A | 5/1980 | Mueller | |
| 4,569,103 A | 2/1986 | Taurinskas | |
| 5,080,629 A * | 1/1992 | Ellison | 452/6 |
| 5,403,230 A | 4/1995 | Capriglione, Sr. | |
| 5,586,931 A | 12/1996 | Williams, Jr. | |
| 5,613,904 A | 3/1997 | LaSalle et al. | |
| 6,390,911 B1 | 5/2002 | Lombardo | |
| 7,024,777 B1 * | 4/2006 | Bach | 30/120.1 |
| 2001/0045016 A1 | 11/2001 | O'Brien et al. | |
| 2006/0027064 A1 * | 2/2006 | Panik et al. | 83/13 |
| 2006/0099896 A1 * | 5/2006 | Mindes | 452/3 |

* cited by examiner

*Primary Examiner*—Hwei-Siu Payer
(74) *Attorney, Agent, or Firm*—Akin Gump Strauss Hauer & Feld, LLP

(57) ABSTRACT

A combination utensil for preparing and eating crustaceans comprising an elongated handle portion having opposing longitudinal ends; a crustacean shell breaking tool extending integrally from one of the longitudinal ends; and a fork extending integrally from a remaining one of the two longitudinal heads.

3 Claims, 1 Drawing Sheet

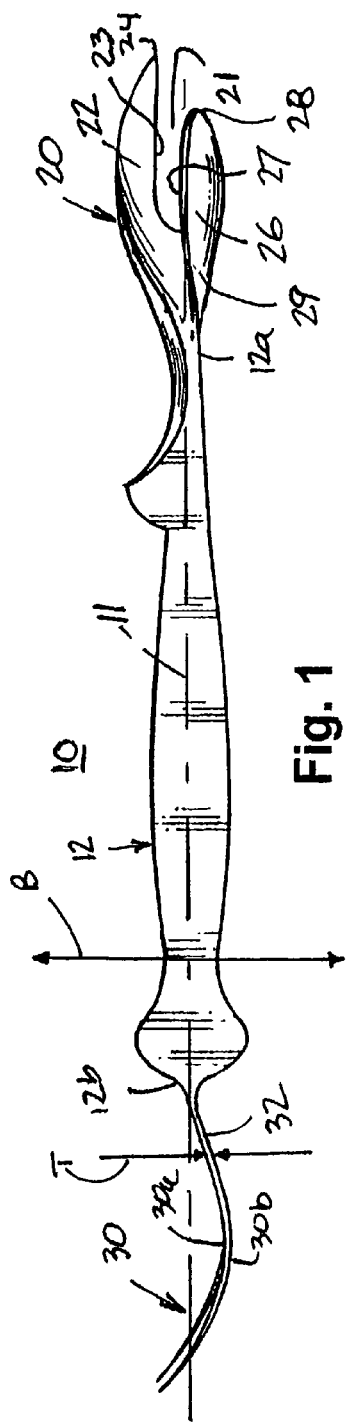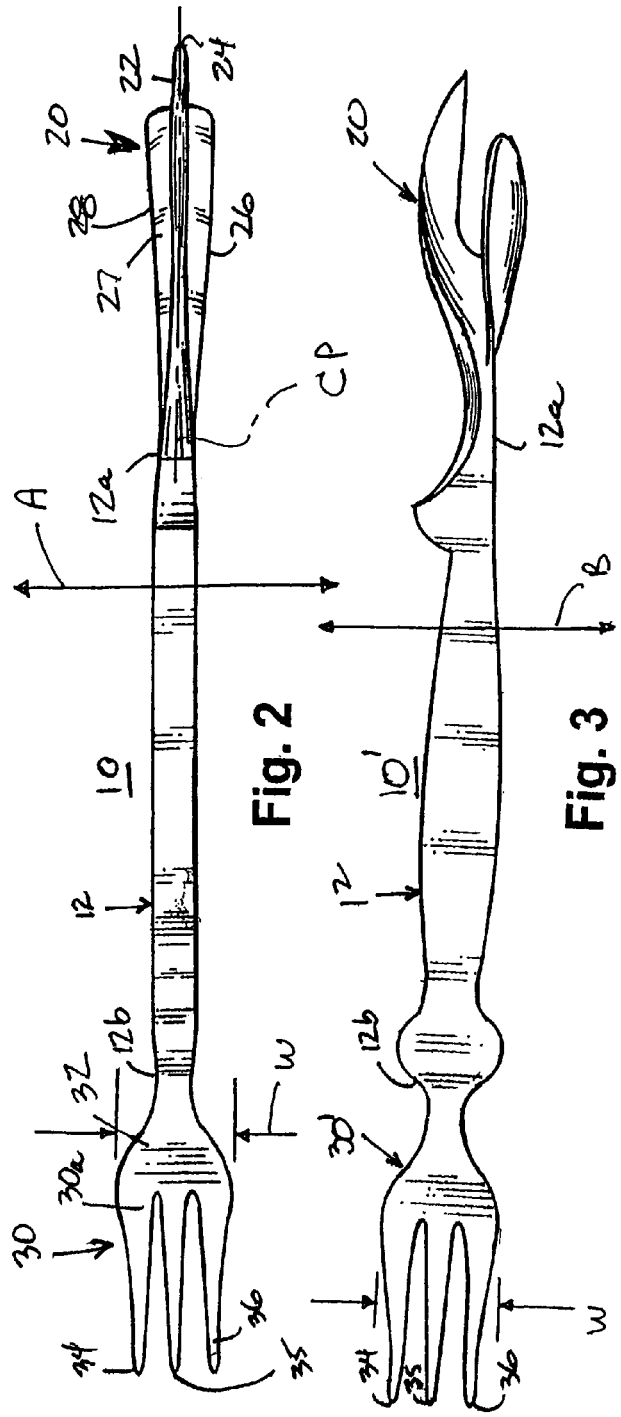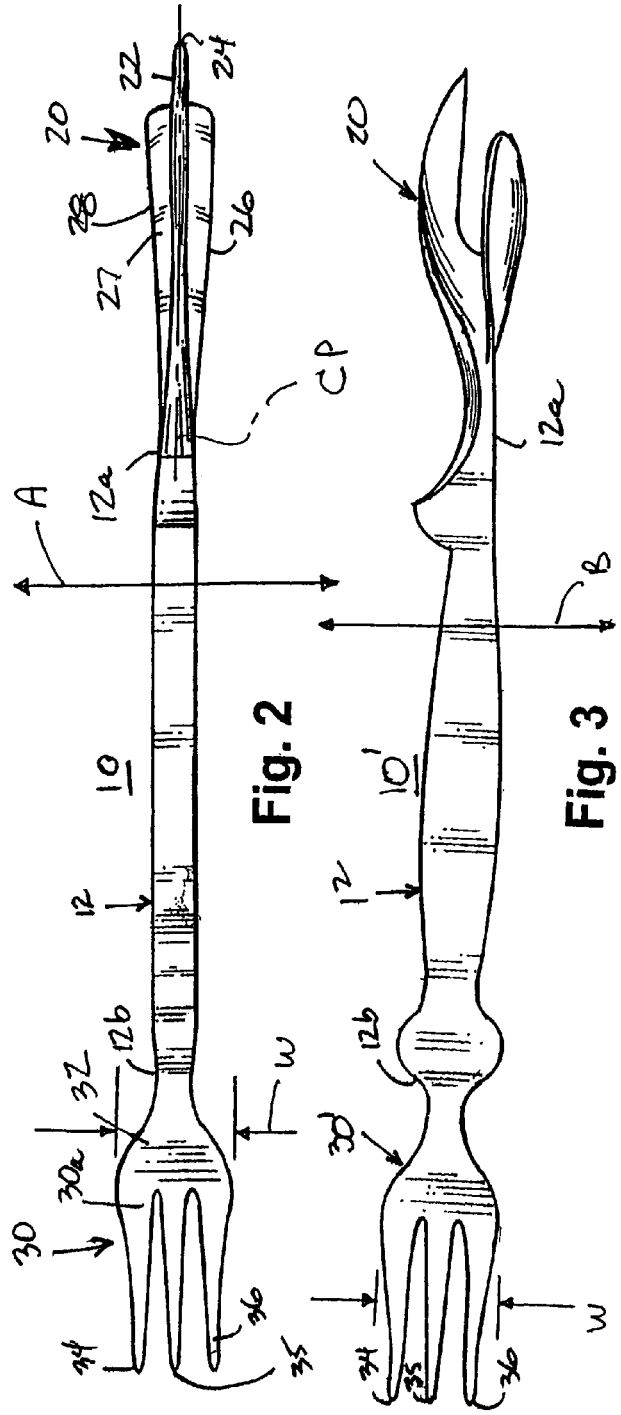

COMBINATION UTENSIL

CROSS-REFERENCE TO RELATED APPLICATIONS

This application is a continuation of application Ser. No. 10/407,815, filed Apr. 3, 2003, now U.S. Pat. No. 7,024,777, which claimed the benefit of U.S. Provisional Patent Application No. 60/369,551, filed Apr. 3, 2002.

BACKGROUND OF THE INVENTION

This invention relates to utensils and, in particular, utensils for use with crustaceans.

BRIEF SUMMARY OF THE INVENTION

The invention is a combination utensil for preparing and eating crustaceans comprising an elongated handle portion having opposing longitudinal ends; a crustacean shell breaking tool extending integrally from one of the longitudinal ends; and a fork extending integrally from a remaining one of the two longitudinal heads; wherein the shell breaking tool includes first and second members extending generally longitudinally from the one longitudinal end of the handle portion and apart from one another so as to define a generally longitudinally extending slot, the first member having an elongated, generally longitudinally extending, generally pointed edge facing the second member across the slot and the second member having a generally broad and generally flat surface extending longitudinally and transversely to the first member and most proximal to and facing the pointed edge of the first member.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings:

FIG. 1 is a first side elevation of a combination utensil according to the present invention;

FIG. 2 is a side elevation of the utensil of FIG. 1 rotated ninety degrees; and

FIG. 3 is a modified version of the utensil of FIGS. 1 and 2.

DETAILED DESCRIPTION OF THE INVENTION

FIGS. 1 through 2 depict a first combination utensil 10 of the present invention particularly suited for the preparation and eating of crustaceans. The utensil is preferably one piece and includes an elongated central handle portion indicated generally at 12 having opposing longitudinal or axial ends 12a, 12b, a crustacean shell breaking tool indicated generally at 20 located at one of the longitudinal ends 12a and a fork indicated generally at 30 located at a remaining one 12b of the longitudinal ends.

The crustacean shell breaking tool 20 includes first and second members 22, 26 extending generally longitudinally from the one longitudinal end 12a of the handle portion 12. The first and second members extend generally parallel and spaced apart from one another after diverging from one another at the one end 12a of the handle portion 12 and define a generally longitudinally extending slot 21 between them. The first member 22 is preferably generally wedge shaped, having a body which generally inwardly tapers in toward and extends into the slot 21 to a generally pointed longitudinal edge 23 located most proximal to the second member 26. The second member 26 has a surface 27 most proximal to and facing the pointed edge 23 of the first member 22, extending generally longitudinally (along longitudinal axis 11) and transversely (along arrow A). The edge 23 and surface 27 define the boundary of the slot 21. The first member 22 is generally longer and thinner than the second member 26 and is tapered generally to a point 24 at its extreme longitudinal or distal end. The outer perimeter 28 of the transverse surface 27 of the second member 26 is preferably generally rounded and the remainder 29 of the outer surface of the member 26 extending from the outer perimeter 28 is preferably generally convex particularly for strength and safety.

The fork 30 includes a base portion indicated generally at 32 flaring away from the remaining end 12b of the handle portion 12. The base portion 32 is wider than the adjoining end 12b of the handle portion 12 in a first "width" dimension W (extending generally parallel to the direction of arrows A), generally perpendicular to the longitudinal direction of the utensil 10 and seen in FIG. 2 and thicker than the end 12b in a second "thickness" transverse dimension T (extending generally parallel to the direction of arrows B), generally perpendicular to the the longitudinal direction of the utensil 10 and seen in FIG. 1. The thickness dimension is generally parallel to a central plane CP of FIG. 2 and perpendicular to the central longitudinal axis 11 of FIG. 1. The fork 30 further includes a plurality of tines 34, 35, 36 extending away from the base portion 32 and the remainder of the utensil 10, i.e., the handle portion 12 and tool 20. Preferably, the fork 30 undulates in its thickness direction. That is, the base portion 32 first curves away from the proximal end 12b of the handle portion 12 and a central longitudinal axis 11 of the handle portion at least at the second end 12b while the tines 34–36 curve back at least toward if not through the axis 11 to define generally concave and convex major sides 30a, 30b, respectively, of the fork 30.

Preferably too, one of the two major sides of the fork 30 is located on one side of utensil 10 with the pointed member 22 of the tool 20 so that a central plane CP (see FIG. 2) of the tool 20 extending through a middle portion of the first member 22, a middle portion of the slot 21, and a middle portion of the second member 26 extends along the longitudinal axis 11. Preferably, the fork 30 is symmetric about the central plane CP (as illustrated in FIG. 2). Which major sides 30a, 30b is located on the same side of the utensil 10 as the pointed member 22 will depend upon which goal is to be more conveniently met. If the concave side 30a is on the same side as the pointed member 22, the utensil 10 can be easily pivoted in the user's hand from the breaking position with the tool 20 extending outwardly from the user's palm between the user's thumb and forefinger in the direction of the thumb and forefinger to the conventional position of the fork with the handle 12 (and, in this case, tool 20) extending from between the user's thumb and forefinger but pointing in a direction away from the extended direction of the thumb and forefinger. If the convex major side 30b is on the same side of the tool 10 as the pointed member 22, then the utensil can be pivoted from the shell breaking position noted above to a position where the distal end of the tines points down to enable the fork 30 to more easily poke and spear meat to remove it from the shell. Of course, if desired, the central plane CP of the tool 20 and the thickness direction of the fork 30 can be located in mutually perpendicular planes. However, then the utensil 10 is not easily used by both right and left handed people as the tines would curve upward and towards the right-handed user and down and away from the left-handed user. One such alternate embodiment is depicted in FIG. 3 and indicated generally at 10'. Its major components, the body 12 and shell breaking tool 20 are identical to those of the first embodiment 10 while the fork 30' is essentially identical to fork 30 but rotated 90°.

To use the device 10, the thin pointed end 24 in the first member 22 is inserted into a shelled portion of a crustacean such as the body shell or claws of a lobster as deeply as the slot 21 permits with the transverse surface 27 of the second member 26 located against the outer surface of the shell portion receiving the pointed member 22. The user then pivots the handle 12 about the one end 12a of the utensil 10 bringing the pointed edge 23 of the first member 22 to bear against the inner surface of the shell and the transverse surface 27 of the second member 26 to bear against the outer surface of the shell spaced slightly away from the line or point of contact of the edge 23. The pointed edge 23 of the first member 22 concentrates the applied force while the broad transverse surface 27 of the second member 26 distributes its opposing force against the shell on opposite sides of the pointed edge 23 so as to cause the shell to break beneath the edge 23 providing access to the flesh within the shell. The pointed end 24 of the first member 22 may also be used to stick and draw out portions of meat from within the shell. These portions may then be eaten with the fork 30 located at the opposite end of the utensil 10 simply by rotating the tool 10 in the user's hand so that the fork end 12b of the handle 12 extends outward from the user's hand and end of the user's fingers.

The provision of both heads 20, 30 in a single utensil 10 makes it much easier for the user to open and eat crustaceans as the utensil 10 never has to leave the user's hand. Where individual utensils are provided, the user is constantly exchanging utensils and can easily lose one or the other in a pile of crustacean shells and other waste that is often generated while consuming these creatures.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A combination utensil for preparing and eating crustaceans comprising:
    an elongated handle portion having opposing longitudinal ends;
    a crustacean shell breaking tool extending integrally from a first one of the opposing longitudinal ends; and
    a fork extending integrally from a second one of the opposing longitudinal ends;
    wherein:
        the shell breaking tool includes first and second members extending generally longitudinally from the one longitudinal end of the handle portion and apart from one another so as to define a generally longitudinally extending slot, the first member having an elongated, generally longitudinally extending, generally pointed edge facing the second member across the slot and the second member having a generally broad and generally flat surface extending longitudinally and transversely to the first member and most proximal to and facing the pointed edge of the first member,
        the fork includes a generally convex major side and an opposing, generally concave major side, and
        the first member and the concave major sides of the fork are located on one lateral side of the utensil.

2. The utensil according to claim 1 formed of one piece from one material.

3. The utensil according to claim 2 molded from a polymer plastic.

* * * * *